United States Patent [19]  [11] 3,874,905
Knights  [45] Apr. 1, 1975

[54] WAX COATED PAPER OF IMPROVED WATER RESISTANCE

[75] Inventor: Evord F. Knights, Anaheim, Calif.

[73] Assignee: Union Oil Company of California, Los Angeles, Calif.

[22] Filed: June 28, 1973

[21] Appl. No.: 374,550

[52] U.S. Cl.................. 117/76 P, 117/45, 117/92, 260/29.6 TA
[51] Int. Cl.......................... B65d 5/56, B32b 29/06
[58] Field of Search ........................... 117/92, 76 P

[56] References Cited
UNITED STATES PATENTS

| | | | |
|---|---|---|---|
| 2,746,878 | 5/1956 | Rush............................... | 117/76 P X |
| 2,804,205 | 8/1957 | Barton et al....................... | 117/76 P |
| 3,055,496 | 9/1962 | Dunlap........................... | 117/76 P X |
| 3,256,234 | 6/1966 | Miller............................. | 117/76 P |
| 3,330,689 | 7/1967 | Ells et al.......................... | 117/92 X |
| 3,659,772 | 5/1972 | Dorsey et al...................... | 117/92 X |

Primary Examiner—Ralph Husack
Attorney, Agent, or Firm—Lannas S. Henderson; Richard C. Hartman

[57] ABSTRACT

Wax coated paper products of improved water resistance are produced by first coating the raw paper with a light coating of a styrene-butadiene rubber latex, drying and curing, and then applying a relatively heavier coating of paraffin wax over the rubber coated substrate. The combination of the two coatings is found to give a synergistic improvement in water resistance, as compared to either coating alone.

14 Claims, No Drawings

WAX COATED PAPER OF IMPROVED WATER RESISTANCE

BACKGROUND AND SUMMARY OF THE INVENTION

Paraffin waxes have found extensive use as coating materials for a variety of paper products to render them more impervious to penetration by water, primarily for use in the packaging of wet food products for shipping and storage. In one important application, corrugated paperboard box blanks are coated or impregnated with paraffin wax to form water resistant boxes, sometimes called "wet pack" boxes, for use in the storage and shipment of certain produce and other perishable goods to be shipped in an iced condition. In one application, water resistant boxes containing the perishable goods are loaded into refrigerated railroad cars or trucks and the entire cargo packed in ice. In another application crushed ice is placed directly in the boxes along with the perishable commodity. In these various applications, the box blanks may be coated either on the inside or the outside surface, or on both surfaces, depending upon the particular type of water barrier needed. Boxes manufactured from these impregnated or coated paperboards remain relatively uneffected by water for substantial periods of time, thereby maintaining their body and shape during transit of the goods.

While paraffin wax alone forms an adequate water barrier for many applications, a still more effective barrier is desirable for more severe or extended exposure conditions. Many more or less successful attempts have been made to improve water resistance, most commonly by the addition of various polymeric materials to the molten paraffin wax, such as polyethylene, ethylene-vinyl acetate copolymers and the like. Another approach has been to provide a dual coating composed of one polymeric material applied directly to the paper surface, over which the wax coating is applied. For example, in U.S. Pat. No. 2,984,585 an undercoating of polyethylene is first applied and paraffin wax is then applied as an overcoating. The combination is said to give a synergistic improvement in water vapor transmission resistance. However, the application of uniform coatings of polyethylene to paper surfaces is difficult to control, and requires expensive extrusion techniques which renders the process uneconomical for many applications.

A much more facile and economical approach to the undercoating idea would be to utilize an undercoating material which could be applied to the paper by standard coating, printing or inking techniques, involving for example the use of a size press, or Meyer machine. However, most polymeric coating materials are too viscous for this technique at practical melt temperatures. Many polymeric materials could of course be applied as a solvent solution, but such solvent coating presents the decided disadvantage, as well as hazard, of collecting and disposing of the evaporated solvent.

It is known in the art that rubber latices can be successfully applied to paper surfaces by the above noted printing techniques. Acrylic latices are in fact often used as a vehicle and binder for various printing ink pigments, and the resulting printing inks are often utilized on corrugated box boards. However such printing ink applications are not necessarily continuous over the entire surface of the box board, and would not necessarily provide any significant increase in water resistance (after applying a paraffin wax overcoating) unless the acrylic latex binder were formulated with the proper surfactants, and using the proper manufacturing techniques, to obtain a latex which yields a substantially water impervious film upon curing.

I have now discovered however that styrene-butadiene rubber (SBR) latices in general, and certain types in particular, provide substantially water impermeable films upon curing and that a highly synergistic improvement in water resistance is obtained by applying a thin coating of SBR latex to the surface of the paper, curing and then overcoating with standard paraffin wax coatings. A most important aspect of the invention is that the synergistic result is obtained even when the latex coating is so light (economical) that in itself it gives an almost negligible improvement in water resistance. This would clearly seem to indicate that these light coatings of latex do not, on a surface such as kraft paper, give a micro-continuous film such as one skilled in the art might consider necessary to significantly improve water resistance. While I am unable to account with certainty for this remarkable synergism the following non-limiting theoretical explanation is offered:

The process of this invention is designed particularly for use in the coating of liners for corrugated paperboards, which liners are usually composed of uncalendered or only lightly calendered, and relatively unfilled kraft paper which is relatively porous and exhibits a somewhat "furry" exterior surface of protruding fibers. Conventional wax coating methods tend to leave some of these fibers protruding through the exterior surface of the wax coating, around or through which water may enter to penetrate the wax coating. It is conceivable that even a very light latex coating applied by the printing technique may tend to "glue" these protruding fibers down onto the general surface level of the paper, thus preventing their exposure through the subsequently applied wax coating. Thus, even though insufficient latex is applied to improve water resistance significantly, the effectiveness of the wax overcoating is materially improved. Strangely enough however, even though the foregoing theory would seem to imply that any type of rubber latex should be effective, I have found that those which give substantially water impermeable films upon curing are much more effective than those which do not. Thus, the observed results may depend upon more than one characteristic of the latex film.

DETAILED DESCRIPTION

Operative SBR latices for use herein may comprise substantially any aqueous dispersion of a copolymer formed by the emulsion copolymerization of styrene and butadiene in proportions from about 40/60 to 85/15 weight parts of styrene to butadiene, in the presence of conventional polymerization initiators, emulsifying agents, anionic or non-ionic surfactants, buffering agents, chain terminators, etc. In order to improve the adhesiveness and bond strength of films prepared from the latex compositions, it is also preferable to include in the emulsion copolymerization a minor proportion of an alpha beta-ethylenically unsaturated $C_3$ to about $C_6$ mono- or di-carboxylic acid or an amide thereof. These preferred "carboxylated" compositions are essentially terpolymers of butadiene, styrene and the unsaturated acid. Examples of suitable carboxylating acids include acrylic, methacrylic, crotonic, tiglic, angelic, senesioic, hexenoic, tetracrylic, maleic, fumaric, citriconic, mesaconic, itaconic, glutaconic, muconic, acids, etc. Generally these acids have from 3 to about 6 carbons and, of these, acrylic and itaconic acids are normally preferred. Suitable amides include acrylamide, N-methylolacrylamide, methacrylamide, crotonamide, tiglamide, anelamide, hexeonic amide, tetracrylamide, maleamide, fumaramide, itaconamide, etc. Of these acrylamide is preferred for its ready availability and effectiveness.

To achieve maximum water resistance of the latex coating it is preferred to use an anionic surfactant, and still more preferably an anionic surfactant which has a critical micelle concentration of less than about 0.2 weight-percent. The critical micelle concentration of anionic surfactants or emulsifying agents can be determined by various methods. The properties of solutions of these surfactants change abruptly at the critical concentration, presumably due to the formation of ionic micelles. Accordingly, a series of samples of incrementally increasing concentrations of a particular surfactant under investigation can be prepared, and the value of a selected property of these solutions can be observed to determine at what concentration such property abruptly changes. Various properties can be used in this determination, e.g., surface tension or electrical conductivity. Because the electrical conductivity can be measured relatively simply using a conductivity bridge, the latter method is preferred. This method is described in J.A.C.S., vol. 61, pages 549–554. In this measurement, conductivity cells are filled with the solutions under investigation, placed in a thermostatically controlled, constant temperature bath, and the specific conductance of the solutions determined using a standardized procedure. With these solutions, there will be observed a gradually increasing specific conductance with increasing concentration until, at the critical micelle concentration, a sharp departure from this mode occurs, and the specific conductance of the solution follows a different path or relationship with increasing concentration of surfactant.

Suitable anionic surfactants which can be employed include the alkali metal and ammonium soaps, the alkali metal or ammonium alkyl sulfates, the alkali metal or ammonium alkyl sulfonates, the alkali metal or ammonium alkylbenzene sulfonates, alkali metal or ammonium ester sulfonates, alkali metal or ammonium sulfated or sulfonated fatty amines or amides, alkali metal or ammonium sulfated fatty acids, alkali metal or ammonium sulfated fatty glycerides, or alkali metal or ammonium salts of fatty alkyl substituted dicarboxylic acids.

A very suitable class of anionic surfactants which possess the preferred low critical micelle concentration are the alkali metal or ammonium salts of the following sulfonated alkanedioic amide:

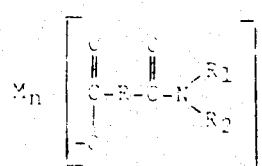

wherein M is the same or different cation selected from the group of ammonium or alkali metals;

$n$ is 3 or 4;

R is a sulfoalkylene having from 2 to about 7 carbons such as sulfopentamethylene, sulfoethylene, sulfotrimethylene, sulfotetramethylene or sulfohexamethylene;

$R_1$ is alkyl having from 5 to about 20 carbons such as amyl, hexyl, heptyl, isooctyl, 2-ethylhexyl, octadecyl, or eicosyl; and $R_2$ is mono- or di-carboxyalkyl having 2 to about 8 carbons such as carboxymethyl, dicarboxyethyl, 1,2-dicarboxypropyl, 1,2-dicarboxyamyl, 1,4-dicarboxyheptyl or carboxyoctyl.

Examples of suitable compounds falling within this definition of the additive include trisodium N-carboxymethyl N-dodecylsulfosuccinamide, tetrasodium N(1,2-dicarboxyethyl) N-octadecylsulfosuccinamide, triammonium N(carboxyethyl) N-octadecylsulfoadipamide, tetrapotassium N(1,5-dicarboxypentyl) N-hexylsulfomalonamide, dipotassium disodium N(1,2-dicarboxyoctyl) N-hexadecylsulfosuccinamide, diammonium dipotassium N(1,2-dicarboxyethyl) N-eicosylsulfosuccinamide, etc.

The polymerization is performed by the conventional emulsion polymerization technique wherein the comonomers are dispersed in the aqueous medium with the aid of a suitable emulsifying agent. This agent should preferably comprise at least about 10 weight-percent, and still more preferably at least about 50 weight-percent, of an anionic emulsifying agent that has a critical micelle concentration in excess of about 1.0 weight-percent. Any of the aforementioned anioinic surfactants which have a hydrophobic group of a sufficiently low molecular weight to possess a critical micelle concentration greater than about 1.0 weight-percent can be employed. The critical micelle concentration is approximately quadrupled for every decrease of 2 carbon atoms in the hydrophobic portion of the molecule.

A particularly useful class of anionic emulsifying agents which can be employed comprise the $C_1$ to $C_{12}$ alkyl and $C_5$ to $C_8$ cycloalkyl esters of alkali metal sulfoalkanedioic acids having from 3 to about 6 carbons. Examples of these include diethyl sodium sulfosuccinate, di-n-octyl potassium sulfosuccinate, dicyclohexyl lithium sulfoglutarate, dicyclopentyl sodium sulfoadipate, diisopropyl lithium sulfomaleonate, dioctyl sodium sulfomaleonate, diamyl sodium sulfoadipate, etc.

While as noted above, anionic surfactants and emulsifiers are preferred, non-ionic materials may also be used, either alone or in admixture with anionic agents. Examples of suitable nonionics which may be used include ethylene oxide condensation products with fatty acids such as lauric acid, oleic acid, stearic acid, etc. Ethylene oxide condensation products with fatty and rosin alcohols are also suitable such as polyoxyethylene lauryl ether, the ethylene oxide condensate with hydryl abietyl alcohol, etc. Other examles include ethylene oxide condensates with alkyl and alkenyl phenols such as ethylene oxide condensate with dodecyl and isododecyl phenol, octyl phenoxy polyethoxy ethanol, etc. Other ethylene oxide condensation products include those with fatty amines and amides having from about 8 to 18 carbons as well as the fatty acid partial esters of hexitans, e.g., polyoxyethylene derivatives of sorbitan monolaurate, sorbitan monopalmitate, sorbitan monostearate, sorbitan monooleate, sorbitan trioleate, etc.

The emulsion polymerization is initiated in known manner by a water soluble free radical initiator such as a water soluble peracid and salt thereof, e.g., hydrogen peroxide, sodium peroxide, lithium peroxide, peracetic acid, persulfuric acid, or the ammonium and alkali metal salts thereof, e.g., ammonium persulfate, sodium peractate, lithium persulfate, potassium persulfate, etc.

Various other agents can be included in the latex composition to impart various desired properties. Included in these are inorganic salts which buffer the emulsion and affect the dispersion of the comonomers in the aqueous medium such as phosphate salts, e.g., diammonium orthophosphate, tetrasodium pyrophosphate, sodium tripolyphosphate, etc. As in conventional practice, a mercaptan or other reaction modifier can be incorporated in the polymerization medium to function as a chain terminator and thereby control the molecular weight of the product.

To summarize the foregoing, optimum latex compositions for use herein are defined by the following formulations:

Table 1

| Component[1] | Broad | Preferred | Most Preferred |
|---|---|---|---|
| Styrene | 40–85 | 50–70 | 50–65 |
| Butadiene | 60–15 | 50–30 | 50–35 |
| Unsaturated Carboxylic acid or amide thereof | 0.4–5.0 | 0.5–2.0 | 0.5–2.0 |
| Emulsifying agent[2] | 1.0–5.0 | 1.8–3.0 | 2.0–3.0 |
| Low critical micelle concentration anionic surfactant | 0.01–4.0 | 0.01–1.0 | 0.02–0.4 |
| Buffering agent | 0–3.0 | 0.1–1.5 | 0.1–0.2 |
| Chain terminator (mercaptan) | 0–5.0 | 0.3–0.5 | 0.3–0.5 |
| Catalyst | 0.1–5.0 | 0.3–0.5 | 0.3–0.5 |

[1] Expressed as weight parts per hundred parts of styrene + butadiene.
[2] At least 10 weight percent of which is an anionic emulsifying agent having a critical micelle concentration above about 1.0 weight-percent.

The foregoing compositions exhibit an optimum combination of properties required for maximum water resistance, including in particular a very small average latex particle size, ranging between about 0.01 and 1.0 micron.

The foregoing latices are applied to one or both of the desired paper surfaces by conventional techniques, utilizing for example a size press or Meyer machine. Following application of the latex, the coated paper is then preferably cured in an oven or other heating device at temperatures between about 150° and 300°F for about 0.5–30 minutes. Normally it is desired to control the latex application so as to apply between about 0.2 and 4 pounds, preferably about 0.5–2 pounds, of total latex solids per 1,000 square feet of paper surface. Optimum amounts will vary with the nature of the paper being coated, but from a generalized economic standpoint this optimum may be expressed in terms of a coating which is only sufficient to increase the water resistance of the paper by about 1–25 percent, as determined by the two-hour water pickup test described hereinafter.

To produce latex coated corrugated paperboard, the latex may be applied to the outer surface of each liner prior to lamination with the corrugated medium, or it may be applied to either or both outer surfaces of the finished laminated paperboard.

Following curing of the latex coated paper, the desired paraffin wax coating is applied by any conventional coating technique, such as dipping, spraying, curtain coating or the like. Substantially any conventional type of paraffin wax may be employed. One particularly preferred type contains about 60 carbon atoms per molecule, has a molecular weight of about 500, and is marketed as Aristowax 143/150 by Union Oil Company of California. Microcrystalline waxes may also be employed, for example a type having a molecular weight of about 1,500 and a needle penetration point of 9 (ASTM-1321-65). Microcrystalline waxes promote heat sealability and impart improved gloss to the coated products. Blends of paraffin wax and microcrystalline waxes may also be employed. One useful type of blend is known as Smiths Bluff 180BOM, and is sold by the Union Oil Company of California.

Other wax compatible polymers and/or copolymers may also be incorporated into the molten paraffin wax. Typical polymers which are often utilized to improve resistance to moisture and improve heat sealability are various polyethylenes and copolymers of ethylene and vinyl acetate.

The following examples are cited to illustrate the invention, but are not to be construed as limiting in scope.

EXAMPLE 1

Several blanks of a kraft paperboard liner, weight 42 lbs/1,000 square feet, were coated on both sides with an SBR latex consisting essentially of a carboxylated (acrylic acid) copolymer of 65 weight percent styrene and 35 percent butadiene, containing the anionic surfactant AEROSOL 22, which is essentially tetrasodium N(1,2-dicarboxyethyl) N-octadecylsulfosuccinamide. The coating was performed using a No. 8 Meyer printing rod. The coated papers were then cured at 250°F for three minutes in a forced draft oven.

Some of the paper samples were then coated at 250°F with a blend of paraffin wax containing 3 percent of dissolved polyethylene. The wax coating was effected by dipping the samples for 20 seconds in the wax bath and then draining in a warm oven at 150° to 200°F for ten minutes.

Water resistance was then determined by immersing each of the samples under water for the times specified in Table 2. The samples were wiped with a dry towel and then weighed. Five duplicates were tested for each sample, giving the following averaged results:

Table 2

| | Pounds/1000 ft² of paper (both surfaces) | | Water Pickup | |
|---|---|---|---|---|
| Sample | Latex solids | Wax | After 2 hours | After 22 hours |
| 1 | 0 | 0 | 32.4 | — |
| 2 | 2.64 | 0 | 30.2 | — |
| 3 | 14.0 | 0 | 14 | — |
| 4 | 0 | 23.9 | 14.7 | 21.4 |
| 5 | 2.43 | 23.4 | 1.7 | 9.1 |
| 6 | 2.38 | 19.6 | 2.8 | — |

The results obtained for samples 5 and 6, as compared to samples 2 and 4, clearly demonstrate the remarkable synergistic effects obtained by using the combination of latex and wax, as compared to either coating alone. A comparison of the results for samples 1 and 2 also shows that the latex coating alone effects very little improvement in water resistance, and sample 3 demonstrates that even with a heavy latex coating the results are merely comparable to those obtained with wax alone (sample 4).

EXAMPLE II

The procedure of Example I was repeated using a nonionic surfactant-stabilized latex differing principally from the latex of Example I in that it contained as the surfactant Igepal CO 887, which is essentially a nonyl phenoxy-poly(ethyleneoxy) ethanol containing about 85 weight percent ethylene oxide equivalent. The results were as follows:

Table 3

| | Pounds/1000 ft$^2$ of paper (both surfaces) | | Water Pickup | |
|---|---|---|---|---|
| Sample | Latex solids | Wax | After 2 hours | After 22 hours |
| 1 | 0 | 0 | 32.4 | — |
| 7 | 1.30 | 0 | 29.8 | — |
| 8 | 1.43 | 24.6 | 5.1 | 14.4 |

The foregoing demonstrates that the nonionic surfactant-stabilized latex also gives a synergistic improvement in water resistance, but not to the same extent as the anionic surfactant-stabilized latex of Example I. It should be noted that the latex of this Example does not produce water-impervious films, while the latex of Examplpe 1 does.

The following claims and their obvious equivalents are intended to define the true scope of the invention:

I claim:

1. A water-resistant paper product comprising a paper substrate having at least one surface thereof coated with a relatively light undercoating consisting essentially of a styrene-butadiene rubber applied thereto as a latex, and a relatively heavier overcoating of paraffin wax applied thereto in molten form, said undercoating comprising about 0.2–4 pounds of latex solids per 1,000 square feet of paper surface, and being in itself only of sufficient thickness to increase the water resistance of said paper substrate by about 1–25 percent.

2. A paper product as defined in claim 1 wherein said latex is stabilized with an anionic surfactant.

3. A paper product as defined in claim 1 wherein said styrene-butadiene rubber is carboxylated with a minor proportion of an alpha-beta ethylenically unsaturated $C_3$ to $C_6$ mono- or dicarboxylic acid or amide thereof.

4. A paper product as defined in claim 1 wherein said substrate is kraft paper.

5. A paper product as defined in claim 1 wherein said latex is stabilized with an anionic surfactant, said styrene-butadiene rubber is carboxylated with a minor proportion of an alpha-beta ethylenically unsaturated $C_3$ to $C_6$ mono- or dicarboxylic acid or amide thereof, and wherein said substrate is a kraft paper.

6. A paper product as defined in claim 1 wherein said substrate is a corrugated box-board.

7. A paper product as defined in claim 6 wherein said latex is stabilized with an anionic surfactant, and wherein said styrene-butadiene rubber is carboxylated with a minor proportion of an alpha-beta ethylenically unsaturated $C_3$ to $C_6$ mono- or dicarboxylic acid or amide thereof.

8. A method for waterproofing a paper surface which comprises,
   1. applying to said surface a light coating consisting essentially of a styrene-butadiene latex, said coating being controlled so as to provide between about 0.2 and 4 pounds of latex solids per 1,000 square feet of paper surface and to increase the water resistance of said paper surface by only about 1–25 percent;
   2. drying and heat-curing the latex-coated surface;
   3. applying over the cured latex-coated surface a relatively heavier coating of molten paraffin wax;; and
   4. cooling the wax-coated surface.

9. A method as defined in claim 8 wherein said latex is stabilized with an anionic surfactant.

10. A method as defined in claim 8 wherein the styrene-butadiene rubber is carboxylated with a minor proportion of an alpha-beta ethylenically unsaturated $C_3$ to $C_6$ mono- or dicarboxylic acid or amide thereof.

11. A method as defined in claim 8 wherein said surface is of a kraft paper.

12. A method as defined in claim 8 wherein said latex is stabilized with an anionic surfactant, said styrene-butadiene rubber is carboxylated with a minor proportion of an alpha-beta ethylenically unsaturated $C_3$ to $C_6$ mono- or dicarboxylic acid or amide thereof, and wherein said substrate is a kraft paper.

13. A method as defined in claim 8, wherein said surface is of a corrugated box-board.

14. A method as defined in claim 13 wherein said latex is stabilized with an anionic surfactant, and wherein said styrene-butdiene rubber is carboxylated with a minor proportion of an alpha-beta ethylenically unsaturated $C_3$ to $C_6$ mono- or dicarboxylic acid or amide thereof.

* * * * *